United States Patent [19]

Calabro et al.

[11] Patent Number: 4,477,025
[45] Date of Patent: Oct. 16, 1984

[54] HOT NOZZLE

[75] Inventors: Max Calabro, Suresnes; Hervé Girard, Les Mureaux; Alain Le Corre, Courbevoie, all of France

[73] Assignee: Societe Nationale Industrielle Aerospatiale, Paris, France

[21] Appl. No.: 957,309

[22] Filed: Nov. 2, 1978

[51] Int. Cl.³ .............................................. B63H 11/00
[52] U.S. Cl. .............................................. 239/265.35
[58] Field of Search ...................... 239/265.11, 265.15, 239/265.35

[56] References Cited

U.S. PATENT DOCUMENTS

| | | | |
|---|---|---|---|
| 3,208,215 | 9/1965 | Brown | 239/265.35 |
| 3,390,899 | 7/1968 | Herbert et al. | 239/265.35 X |
| 3,468,588 | 9/1969 | Bolner | 239/265.15 X |
| 3,504,903 | 4/1970 | Irwin | 239/265.35 X |
| 4,047,667 | 9/1977 | McCullough et al. | 239/265.35 |
| 4,063,684 | 12/1977 | O'Brien et al. | 239/265.11 |

Primary Examiner—Richard A. Schacher
Attorney, Agent, or Firm—Murray Schaffer

[57] ABSTRACT

A hot nozzle formed by a single unitary element formed of a three-dimensional weaving of a carbon substrate. This element is girdled by two thermal insulation rings—which provide suspension and orientation control for the nozzle. Application to nozzles for solid propellant propulsion units.

2 Claims, 1 Drawing Figure

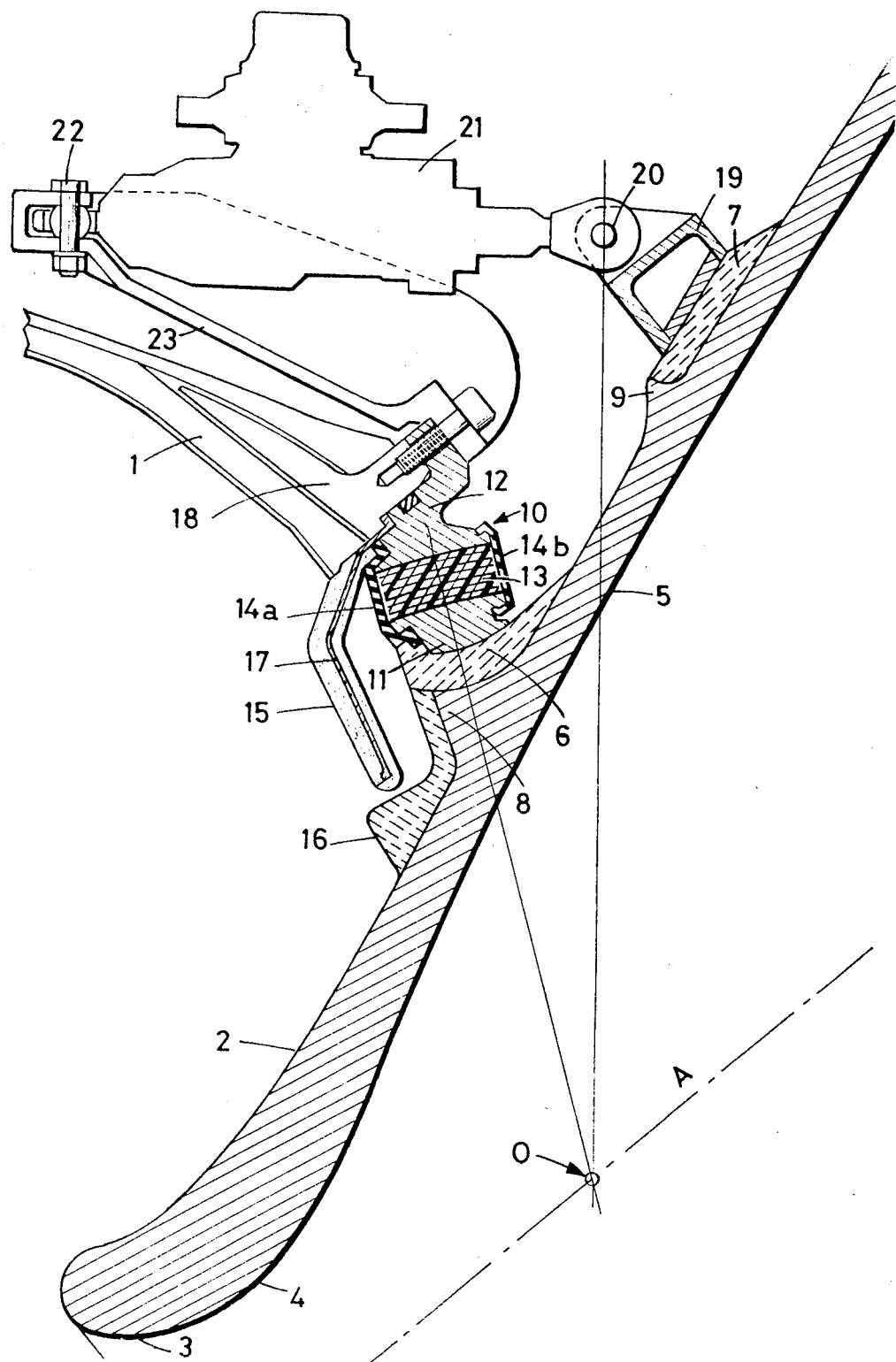

HOT NOZZLE

The present invention relates to a nozzle for propulsion units, and more particularly a hot nozzle for solid propellant propulsion units.

A propulsion nozzle is usually formed by an outer metallic shell lined internally with a composite protective layer embodying at least one refractory material. This is necessary in order to protect the nozzle against the eroding action of the hot gases produced from the combustion of the propellants. The choice, embodiment and arrangement of such a material within the nozzle involve problems which are extremely difficult to solve.

The refractory materials most widely used in recent years are the carbon-containing materials. For the particular application considered herein, these materials have advantages such as a favorable mechanical strength/density ratio, a very good stability of their physical properties at high temperatures, a very high ablating heat and a sublimation temperature in the region of 4000 K.

The carbon-containing material used in the internal protective layer of the nozzle was initially produced from polycrystalline graphite. The gas-flow element is machined from a solid block and is then fitted inside a metal skirt with a thermal insulating material such as refractory cement, for instance, interposed therebetween. With this type of nozzle, there is nevertheless a limit due to the size of the obtainable blocks of graphite. Another drawback stems from the excessive brittleness of polycrystalline graphite, which can crack at random during firing.

Then, in order to improve the erosion-proof properties, pyrographite has been used as carbon-containing material. The pyrographite is obtained in form of slabs of thickness limited to about one centimeter. Consequently, it is necessary to make a stack of slabs set perpendicularly to the nozzle axis and held between elements made of polycrystalline graphite, particularly in the region of the throat of the nozzle. This type of structure leads to a highly irregular airflow profile during firing; moreover the great anisotropy of the thermal and mechanical properties of pyrographite make it necessary to leave expansion clearances that complicate assembly of the nozzle and reduce its reliability.

More recently, the internal protective layer of propulsion nozzles have been made from carbon-carbon composite materials, of which there are several methods of obtention known. A material of this kind is formed by the superposition of a plurality of layers of graphite or carbon webs which are densified by means of e.g. phenolic or furfurylic resins.

The throat of the nozzle consists of several juxtaposed rings of such material, mounted inside a metallic shell through an insulating material, for exemple of the phenolic type. The use of such insulation, which also forms the nozzle portion integrated into the propulsion unit as well as the divergent section of the nozzle, is necessary because of problems of manufacturing and resistance in operation previously encountered with the production of pyrographite nozzles. Further, systematic failure of certain elements through delamination in the course of firings has been noted.

In order to obviate these drawbacks, the composite material has been produced from a multidirectional texture. In such a method multidirectional weaving is used to produce a bulky block of substrate out of which the desired nozzle element can then be machined. However, the size of such elements is limited by difficulties in rigidifying the texture and above all by the cost of manufacturing the substrate block. Two nozzle embodiments have thus been proposed on the basis of such a texture. In the first, the nozzle comprises a plurality of elements assembled in the manner explained previously, hence with the same drawbacks; the second is characterized by the use of an element made of multidirectional composite material for the throat area and of a divergent section made of more conventional carbon-carbon composite. In this design the throat element is held within a metallic shell only at the area of the junction with the divergent section or with the structure; on the other hand, the divergent section requires a metallic shell. Although this type of nozzle permits appreciable weight saving, delicate work is required in achieving and properly sizing the joints between the airflow elements.

The object of this invention is to overcome these drawbacks by providing an hot nozzle of good mechanical strength even at high temperatures, thereby enabling the metallic shell to be dispensed with. A nozzle of this kind is of exceptionally light and simple construction, which contributes to a very high degree of reliability and to a moderate production cost.

Such hot nozzle comprises a single one-piece element shaped to provide the different parts of the nozzle (convergent section throat, divergent section, plus subsidiary useful conformations), said one-piece element consisting of a carbon substrate which is formed by three-dimensional weaving in the final shape of the nozzle and which is then densified.

Preferably, said nozzle is orientable by control means connected to a first thermal insulation ring surrounding the said one-piece element, while a second thermal insulation ring has a thrust unit connected thereto and providing a flexible suspension and a pivoting orientability for the said one-piece element.

The invention has the advantage of providing nozzles of a monobloc structure which is far more simple, rational and reliable than prior-art structures. Such nozzles are furthermore better adapted to the severe operating conditions imposed on them.

The description which follows with reference to the accompanying nonlimitative exemplary drawing will give a clear understanding of how the invention can be carried into practice.

The single FIGURE in the drawing is a diagrammatic illustration in axial section of a nozzle according to this invention with its control components, only one half of the nozzle being shown.

The single FIGURE shows a portion of the bottom 1 of a propulsion unit equipped with a nozzle 2. The nozzle is formed by a one-piece part of revolution about the axis A, made of a carbon substrate and obtained by three-dimensional weaving (preferably in accordance with the method described in patent application Ser. No. 916,554 filed on June 6, 1978, now U.S. Pat. No. 4,182,232) directly into the required shape providing especially a convergent section 3, a throat 4 and a divergent section 5 for nozzle 2.

In accordance with the method described in the aforementioned application, which is jointly owned, the three-dimensional woven article is formed by rotating a plurality of rod-bunches circumferentially arranged about a central axis. Each rod bunch comprises a plurality of elongated rods spaced along a common radius, respectively lying in circumferentially spaced relation to the corresponding rod in the adjacent rod bunch. A substantially continuous yarn is fed between each of the adjacent radially-spaced rods to form superimposed courses of helically wound yarn. A further yarn is simultaneously fed radially between adjacent circumferentially spaced rod bunches intermediate each of the courses and chain stitched to enclose the radially-spaced rods of each rod bunch between each of the courses of helically wound yarn. The helically wound yarn and chainstitched yarn is then pressed along the rods to obtain a generally woven article of uniform density. The article may be shaped simply by inclining the rod bunches relative to the central axis, or their number selectively varied, along the length of the axis.

In the region of divergent section 5, one-piece nozzle 2 is surrounded by two thermal insulation rings 6,7, which can be made of refractory cement or a plastic reinforced with refractory fibers such as silica or asbestos fibers. Rings 6,7 are rigidly united with the wall of nozzle 2 and rest respectively against circular ribs 8,9 formed by the weaving of the nozzle.

Ring 6 provides the mechanical connection, without heat transfer, between the hot wall of nozzle 2 and a "cold" thrust unit 10 which flexibly supports nozzle 2. Thrust unit 10 is composed of an internal metallic armature 11 surrounding ring 6 and rigidly united therewith, of an external metallic armature 12 fastened with the bottom 1 of the propulsion unit through a base 18, and of a flexible block of elastomer 13 interposed between armatures 11 and 12 and preferably protected laterally by membranes 14a, 14b for providing thermal protection and protection against aggressive external agents such as ozone. These membranes are deformable and may be made, say, of rubber.

Additional protection for the thrust unit 10 could be provided on the propulsion-unit side. In the present example, such protection is given by a baffle consisting of a fixed deflector 15 fastened to the bottom 1 of the propulsion unit, and a deflector 16 fastened to the nozzle wall and movable therewith. Deflector 15 comprises a metallic web 17 embedded in a composite, possibly laminated material. Deflector 16 is made of the same material as the contiguous ring 6, or of a like material. The function of the baffle formed thus is to limit the circulation of hot gases in the direction of membrane 14a.

Ring 7 supports one or several metallic box members 19. The box member shown in the drawing is connected through a hinge 20 to a servo actuator 21 controlling pivotal motion of nozzle 2 about a rotation center 0, and through a further hinge 22 to a member 23 fastened to the propulsion unit and fixed to base 18.

What we claim is:

1. A solid propellant jet propulsion unit having a nozzle, said nozzle comprising a substrate of carbon yarn woven three-dimensionally into a shaped body of revolution and densified to form a monobloc structure defining at least a convergent section, a throat, and a divergent section, said body of revolution being provided with a pair of spaced circumferential integrally formed ribs projecting outwardly from the exterior surface thereof, a first thermal insulation ring rigidly connected to and supported by one of said ribs and a second thermal insulation ring rigidly connected to and supported by the other of said ribs.

2. A nozzle according to claim 1, wherein said first thermal insulation ring is adapted to be flexibly supported by a thrust member connected to the propulsion unit and said second thermal insulation ring is adapted to be pivotably supported by a control member connected to the propulsion unit.

* * * * *